April 25, 1967   J. J. BUNDSCHUH ETAL   3,315,911
TAKE-UP REEL FOR MOTION PICTURE PROJECTOR
Filed Jan. 13, 1966
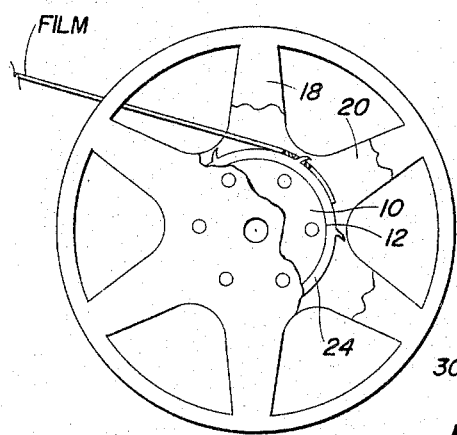
FIG.1
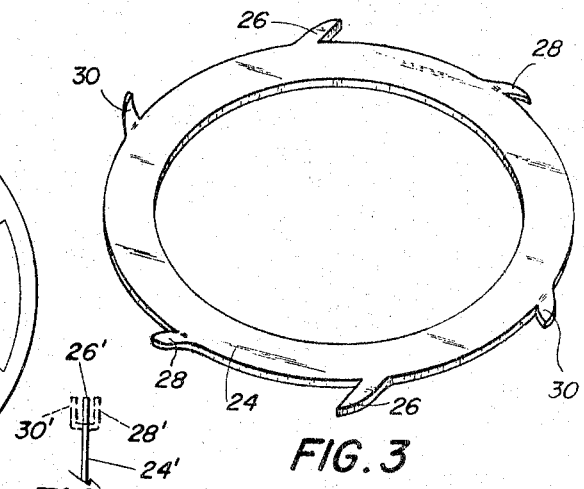
FIG.3
FIG.8
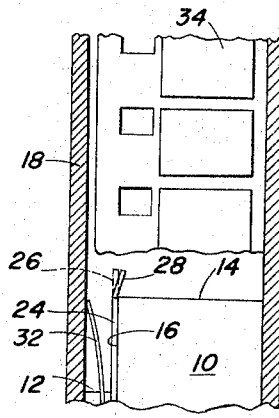
FIG.4
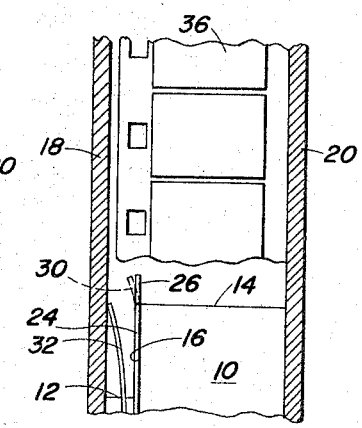
FIG.5
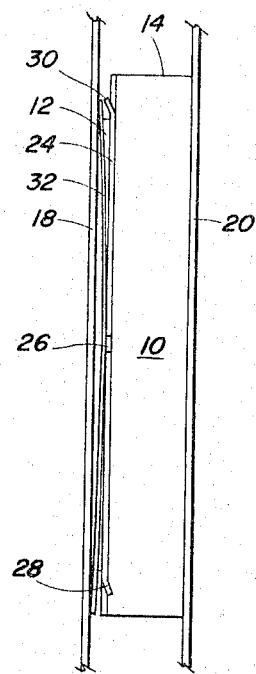
FIG.2
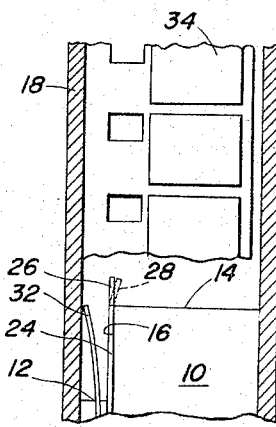
FIG.6
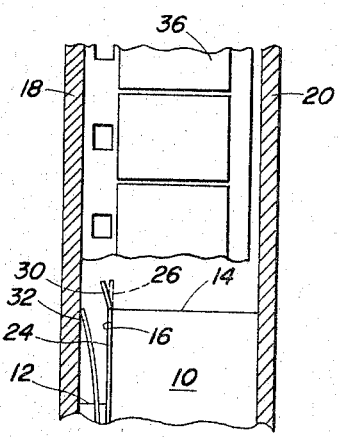
FIG.7
JOHN J. BUNDSCHUH
KENNETH W. THOMSON
INVENTORS
BY
ATTORNEYS United States Patent Office 3,315,911
Patented Apr. 25, 1967

3,315,911
TAKE-UP REEL FOR MOTION PICTURE PROJECTOR
John J. Bundschuh, Penfield, and Kenneth W. Thomson, Rochester, N.Y., assignors to Eastman Kodak Company, Rochester, N.Y., a corporation of New Jersey
Filed Jan. 13, 1966, Ser. No. 520,457
5 Claims. (Cl. 242—74)

This invention relates generally to reels, and more specifically to an improved take-up reel for a motion picture projector or the like.

It is well known in the motion picture projector art to use a take-up reel having a band slideably mounted on a hub, and wherein the band is provided with outwardly extending teeth for engaging the perforations of a film fed into engagement therewith. Reels of this general type are disclosed in U.S. Patents 1,322,114 and 3,053,465. In such reels, the reel flanges are spaced a distance slightly greater than the width of the film. This provides sufficient tolerance to accommodate the film whose width is not entirely constant. In such reels, all of the teeth lie in the same plane, and are positioned between the reel flanges so that they can engage the film perforations at all times, even taking into account the tolerances of the flanges and film. Although such reels may be designed to work satisfactorily with a film having a predetermined perforation size and format, such reels do not work satisfactorily where films of the same width, but a different perforation format are used. For instance, where super 8 and regular 8 film are used, such reels, if designed to accept the regular 8 film, will not satisfactorily take up the super 8 film under all conditions. The perforations for the super 8 film, as seen in FIG. 5 are closer to one edge of the film than for regular 8 film, as seen in FIG. 4. In those instances where the film is taken up on one of the prior art reels with this film edge in engagement with the flange, the teeth on the clutch band may miss the perforations whereupon the film will not be taken up on the hub. Applicants' improved take-up reel eliminates this and other disadvantages of prior known take-up reels.

One of the objects of this invention is to provide an improved take-up reel for satisfactorily taking up film strips having two different perforation sizes and formats.

Another object of the invention is to provide an improved clutch member for a take-up reel that is of simple design and construction, thoroughly reliable and efficient in operation, and economical to manufacture.

To attain these objects, the take-up reel of this invention includes within its scope clutch means rotatably mounted on a hub member and in frictional engagement therewith. The clutch means has a plurality of teeth in which the ends thereof are axially spaced. This may be accomplished by having the teeth lie in axially spaced planes, or in planes transverse to one another. With such clutch means, at least one of the teeth will engage the perforations in films having different size perforations and formats such as regular 8 and super 8 film. Such clutch means successfully accommodates all of the tolerances in the film and reel, and provides a take-up reel that will successfully take up either type of film.

Objects and advantages other than those set forth above will be apparent from the following description when read in connection with the accompanying drawing, in which:

FIG. 1 is a side elevation view of a take-up reel with a portion thereof broken away to show the leading end of the film attached to a clutch member;

FIG. 2 is an enlarged front elevation view of the reel of FIG. 1;

FIG. 3 is an enlarged perspective view of the clutch member shown in FIG. 1;

FIG. 4 is an enlarged segmental side elevation view of a reel to which a regular 8 film is attached having perforations of one size and format, and showing the relationship between the teeth of the clutch member and film perforations when the film is in engagement with one reel flange;

FIG. 5 is a view similar to FIG. 4 showing the attachment to the reel of a super 8 film having a different film perforation size and format, and showing the relationship between the teeth of the clutch member and the film perforations;

FIG. 6 is a segmental view similar to FIG. 4 showing the relationship between the teeth of the clutch member and the film perforations of a regular 8 film when it is in engagement with the other reel flange;

FIG. 7 is a segmental view similar to FIG. 5 showing the relationship between the teeth of the clutch member and the film perforations of a super 8 film when it is in engagement with the other reel flange; and FIG. 8 is a segmental view of a modification of the clutch member of FIG. 3.

Referring to the drawing, a take-up reel is disclosed comprising a hub member 10 having a cylindrical land 12 of one diameter, and an adjacent cylindrical land 14 of a greater diameter. The lands 12, 14 are interconnected by an annular surface 16. Reel flanges 18, 20 are secured to the ends of hub member 10, and are spaced a distance slightly greater than the width of a film to be received.

A mechanism for releasably securing a film onto the take-up reel comprises one modification of an annular clutch disc 24 as best seen in FIG. 3 loosely mounted on land 12 with one side thereof in engagement with surface 16. The inner diameter of disc 24 is slightly greater than the diameter of its supporting land 12 so that the clutch disc is free to rotate thereon. The outer periphery of clutch disc 24 has an outer diameter that is substantially equal to the diameter of land 14, and further has a plurality of radially extending teeth 26, 28, 30, the ends of which are axially spaced for a purpose to be explained hereinafter. An annular bowed spring 32, as best seen in FIG. 2, is mounted on land 12 and has portions at one side bearing against clutch disc 24, and its opposite side engaging the inner surface of flange 18. In this position, spring 32 is slightly compressed for urging clutch disc 24 into engagement with surface 16 with a constant, predetermined force.

As indicated earlier, reel flanges 18, 20 are spaced a distance slightly greater than the normal width of the film in order to insure accommodation of the film therebetween. In addition, the width of film is not perfectly constant but varies slightly. As a consequence of the tolerances between reel flanges 18, 20 and the width of film 22, lateral movement of the film between flanges 18, 20 is possible between two extremes, one when one edge of the film engages flange 18, and the other when the opposite edge of the film engages flange 20. Where only one film 22 is involved, it is possible to locate clutch disc 24 so that its teeth will engage the perforations no matter which extreme position the film is in. However, when film of substantially the same width having different perforation formats is used in the projector, such as regular 8 film 34 and super 8 film 36, due to the different perforation size and format, these same teeth may not engage the perforations in both extreme positions of the film. Applicants have overcome this problem by providing clutch disc 24 with teeth having axially spaced ends, one pair of diametrically opposed, straight teeth 26 lying in the plane of disc 24 which is substantially parallel to the plane of reel flanges 18, 20, two diametrically opposed teeth 28 bent to one side of and transverse to the plane of disc 24, and another pair of diametrically opposed teeth 30 extending to the opposite side of and transverse to the plane of disc 24. With this take-up reel, when a regular 8 film 34 is fed onto the hub of the reel with the film in engagement with flange 20 as seen in FIG. 4, at least one of the ends of teeth 28 will engage the perforation in film 34. Moreover, if film 34 is fed onto the reel with its opposite side in engagement with flange 18 as seen in FIG. 6, the ends of the aforementioned teeth 28 and the straight teeth 26 will both be in position to engage the perforations in film 34. Now, if super 8 film 36 is fed onto the take-up reel, when one of the film edges is in engagement with reel flange 20 as seen in FIG. 5, one or both of the ends of teeth 26, 30 will be in position to engage the film perforations. Moreover, if the opposite edge of film 36 engages flange 18, the ends of teeth 30 will still be in position to engage the perforations of the film. Accordingly, with clutch disc 24, the reel will satisfactorily take-up regular and super 8 film having two different perforation sizes and formats.

In the modification of the clutch disc shown in FIG. 8, parts similar to parts shown in FIGS. 1–7 are denoted by the same numerals primed. In this modification, teeth 26', 28' and 30' are bent so that their ends lie in axially spaced planes. This same effect could be achieved by using three separate, spaced clutch discs, each disc having straight teeth.

The invention has been described in detail with particular reference to a preferred embodiment thereof, but it will be understood that variations and modifications can be effected within the spirit and scope of the invention as described hereinabove, and as defined in the appended claims.

We claim:

1. A take-up reel for a perforated film, comprising:
    a hub member having an axis and a pair of flanges secured to each end of the member spaced a distance slightly greater than the width of a film;
    said hub member further having a film-receiving portion interposed between said flanges onto which said film is wound; and
    clutch means rotatably mounted on said film receiving portion and in frictional engagement therewith;
    said clutch means having a plurality of teeth, the ends of which are axially spaced and extend from the periphery of said clutch means beyond the periphery of said film receiving portion for engaging the perforations of said film as it is directed into winding relationship with said film receiving portion.

2. The invention according to claim 1 wherein one of said teeth has its free end lying in a first plane, and another of said teeth has its free end lying in a second plane spaced therefrom so that no matter where the film is positioned between said flanges at least one of said teeth will engage a film perforation.

3. The invention according to claim 1 wherein one of said teeth lies in a first plane, and another of said teeth lie in a second plane transverse thereto.

4. The invention according to claim 2 wherein one of said first and second planes is substantially parallel to the plane of one of said reel flanges.

5. The invention according to claim 4 wherein said remaining plane extends from said one plane on one side thereof, and said clutch member further includes another tooth being in a third plane transverse to said first and second planes and extending from said one plane on the opposite side thereof.

References Cited by the Examiner

UNITED STATES PATENTS 1,322,114    11/1919    Jenkins _____ 242—74.2
1,799,748    4/1931    Hayden _____ 242—74

FRANK J. COHEN, *Primary Examiner.*

N. L. MINTZ, *Assistant Examiner.*